United States Patent
Bredoire et al.

(10) Patent No.: US 9,638,259 B2
(45) Date of Patent: May 2, 2017

(54) PLUG ASSEMBLY, ROLLING BEARING COMPRISING SUCH PLUG ASSEMBLY AND MACHINE COMPRISING SUCH ROLLING BEARING

(71) Applicants: Vincent Bredoire, Pourrain (FR); Nicolas Chaumont, Mailly la Ville (FR); Michel Nicolas, Annay la Côte (FR)

(72) Inventors: Vincent Bredoire, Pourrain (FR); Nicolas Chaumont, Mailly la Ville (FR); Michel Nicolas, Annay la Côte (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/864,941

(22) Filed: Sep. 25, 2015

(65) Prior Publication Data

US 2016/0091025 A1    Mar. 31, 2016

(30) Foreign Application Priority Data

Sep. 29, 2014    (EP) .................................... 14306521

(51) Int. Cl.
*F16C 19/26*        (2006.01)
*F16C 43/06*        (2006.01)
(Continued)

(52) U.S. Cl.
CPC .............. *F16C 43/06* (2013.01); *F16C 19/26* (2013.01); *F16B 37/14* (2013.01); *F16C 19/16* (2013.01);
(Continued)

(58) Field of Classification Search
CPC .......... F16C 43/04; F16C 43/06; F16C 19/26; F16C 19/16; F16C 2208/36; F16C 2360/31; F16B 37/14
See application file for complete search history.

(56) References Cited

U.S. PATENT DOCUMENTS 3,148,922 A    9/1964    Roessler, Jr.
3,275,391 A *  9/1966    Blais ..................... F16C 19/362
                                                            384/447
(Continued)

FOREIGN PATENT DOCUMENTS

DE    19837579 A1    2/2000
EP    0375938 A1    7/1990
(Continued)

*Primary Examiner* — Alan B Waits
(74) *Attorney, Agent, or Firm* — Bryan Peckjian; SKF USA Inc. Patent Dept.

(57) ABSTRACT

A plug assembly for use in a rolling bearing comprising at least a first ring, at least one second ring, and at least one row of rolling elements arranged between the rings. The first ring is provided with an opening for inserting rolling elements into a space between raceways or for taking rolling elements out of the space between the raceways for assembly and maintenance. The plug assembly comprises a plug configured to close the opening when the bearing is operating. The plug includes an inner end face facing the rolling elements and an outer end face opposite to the inner end face. The bearing can further comprise a protective cap shielding the outer end face of the plug from a corrosive environment of the bearing.

11 Claims, 2 Drawing Sheets

(51) Int. Cl.
*F16B 37/14* (2006.01)
*F16C 19/16* (2006.01)

(52) U.S. Cl.
CPC ...... *F16C 2208/36* (2013.01); *F16C 2360/31* (2013.01)

(56) References Cited

U.S. PATENT DOCUMENTS

| | | | | |
|---|---|---|---|---|
| 3,948,578 A * | 4/1976 | Martin | ............... | F16C 19/38 29/898.061 |
| 4,606,654 A * | 8/1986 | Yatsu | ............... | F16C 43/06 384/447 |
| 4,906,113 A * | 3/1990 | Sague | ............... | E02F 9/12 384/507 |
| 4,961,653 A * | 10/1990 | Suzuki | ............... | F16C 43/06 384/447 |
| 5,026,177 A * | 6/1991 | Masuda | ............... | F16C 19/362 384/447 |
| 5,033,873 A * | 7/1991 | Suzuki | ............... | F16C 19/163 384/447 |
| 5,104,239 A * | 4/1992 | Sague | ............... | F16C 19/38 29/898.01 |
| 5,184,928 A | 2/1993 | Tsukada | | |
| 5,218,764 A * | 6/1993 | Suzuki | ............... | F16C 19/163 29/557 |
| 6,053,683 A | 4/2000 | Cabiran | | |
| 7,478,479 B2 * | 1/2009 | Ohno | ............... | F16C 19/362 29/898 |
| 8,408,803 B2 * | 4/2013 | Kunimoto | ............ | F16C 19/362 384/447 |
| 8,753,015 B2 * | 6/2014 | Kuo | ............... | F16C 19/362 384/447 |
| 8,944,692 B2 * | 2/2015 | Hori | ............... | F03D 7/0204 384/507 |
| 9,255,607 B2 * | 2/2016 | Bouron | ............... | F16C 33/583 |
| 2016/0146254 A1 * | 5/2016 | Katsaros | ............ | F16C 33/7816 384/448 |

FOREIGN PATENT DOCUMENTS

| | | | |
|---|---|---|---|
| EP | 2184227 A1 | 5/2010 | |
| FR | 2222897 A5 | 10/1974 | |
| FR | EP 0811777 A1 * | 12/1997 | ............ F16C 19/362 |
| WO | 2012126529 A1 | 9/2012 | |

* cited by examiner

PLUG ASSEMBLY, ROLLING BEARING COMPRISING SUCH PLUG ASSEMBLY AND MACHINE COMPRISING SUCH ROLLING BEARING

CROSS REFERENCE TO RELATED APPLICATION

This is a Non-Provisional Patent Application, filed under the Paris Convention, claiming the benefit of Europe (EP) Patent Application Number 14306521.7, filed on 29 Sep. 2014 (29.09.2014), which is incorporated herein by reference in its entirety.

FIELD OF THE INVENTION

The invention relates to rolling bearings, in particular to slewing bearings for submarine applications.

BACKGROUND OF THE INVENTION

It is known to provide large-sized rolling bearings, in particular angular contact rolling bearings formed as slewing bearings with large diameters e.g. for wind turbine applications or applications in construction machinery, with an opening for inserting or removing rolling elements upon assembly or for maintenance works.

In angular contact rolling bearing including an opening and a plug for closing the opening is disclosed e.g. in the document WO 2012/126529.

In recent times, there is an increasing request for large-sized rolling bearings suitable for submarine applications e.g. tidal power plants, oil trilling applications or offshoring parks. As the inner face of the plugs constitutes a part of the raceway of the rolling bearing, the plugs are usually made from bearing steel, which corrodes when exposed to sea water. The corrosion is a problem because it makes the removal of the plug for maintenance purposes difficult and impairs the watertightness of the plug.

Manufacturing the plug from stainless steel causes further problems because the machining of the raceways, which is usually done in a configuration where the plug is fitted into the opening, becomes difficult and it would be impossible to achieve high quality surface properties for the raceways. Further, a piling up of material on the raceway at the boundary between different material types risks to take place. Finally, the price of plugs manufactured from materials which are resistant to the sea water is very high.

Further, treating the surface of the plug with nickel-based coatings could work but the coating wears out very rapidly after only a few mounting and unmounting cycles.

SUMMARY OF THE INVENTION

It is therefore the object of the invention to avoid corrosion of a plug in a bearing as described above and, as a consequence, a reduction of the watertightness and the reduction of the lifetime of the rolling bearing resulting from sea water leaking in.

The invention starts from a plug assembly for a rolling bearing comprising at least a first ring and at least one second ring. The first ring could be an inner ring and the second ring could be an outer ring or vice versa. Further, the rolling bearing comprises at least one row of rolling elements arranged between the rings. The rolling elements could be balls, tapered rollers or cylindrical rollers as well as toroidal rollers. The bearing could be formed as an angular contact rolling bearing or as another kind of bearing, in particular slewing bearing. The rolling bearing is provided with an opening in one of its rings for inserting rolling elements and for taking out the rolling elements out of the space for maintenance or assembly purposes. The opening is closed with a plug of the plug assembly when the bearing is operating, wherein the plug has an inner end face facing the rolling elements and preferably constituting a part of the raceway and an outer end face opposite to the inner end face.

It is proposed that the plug assembly further comprises a protective cap shielding the outer end face of the plug from a corrosive environment of the bearing. By forming the cap from a material with high corrosion-resistivity a reliable protection of the plug can be achieved and corrosion can be avoided. The mounting and unmounting of the plug remains simple and the watertightness cannot be reduced as a consequence of the corrosion.

In a preferred embodiment, the protective cap is made of polyetheretherketone (PEEK), which is highly resistant to sea water corrosion, cheap and simple in terms of manufacturing.

It is further proposed to provide a gasket ring between the protective cap and the surface of the first ring surrounding the opening. The surface of the first ring surrounding the opening is preferably recessed such that that the protective cap can be formed in a flush countersunk manner. The gasket ring avoids sea water leaking in laterally from the edges of the protective cap.

In a preferred embodiment of the invention, the protective cap is fixed by stainless steel bolts on a surface of the first ring surrounding the opening. The steel bolts are cheap in price, easy to fasten and unfastened and highly resistant to corrosion.

Preferably, the gasket ring is arranged between the stainless steel bolts and the opening and is quenched between the protective cap and the surface of the first ring by a pressing force generated by the stainless steel bolts.

Further, it is proposed that the plug has an essentially cylindrical outer surface provided with at least one circumferential groove for receiving an O-ring in order to further increase the liquid-tightness of the plug.

In particular, an embodiment where the rolling bearing further comprises a locking pin fitted into a transversal bore of the plug, it is preferred that at least one O-ring is arranged between the transversal bore and the outer end face of the plug. As a consequence, sea water leaking in via the lateral bore in the first ring receiving the locking pin is prevented from reaching the raceway. In a most preferred embodiment, O-rings are arranged on both sides of the transversal bore and the plug.

The invention also concerns a machine, such as a generator of a tidal power plant, equipped with at least one rolling bearing according to the invention, the rolling bearing comprising at least one plug assembly according to the invention.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
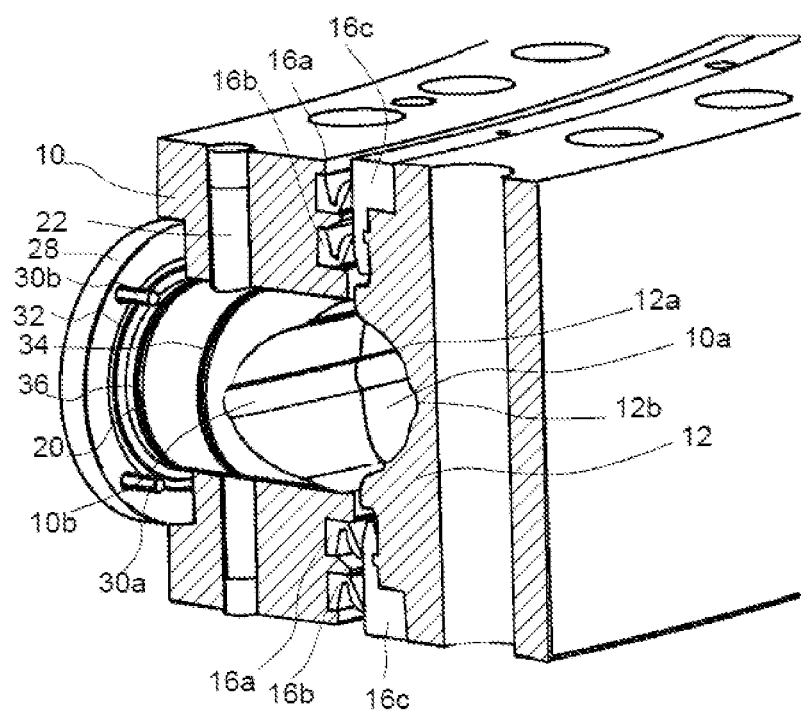
FIG. 1 is a partial section of a rolling bearing according to the invention.
Figure 2:
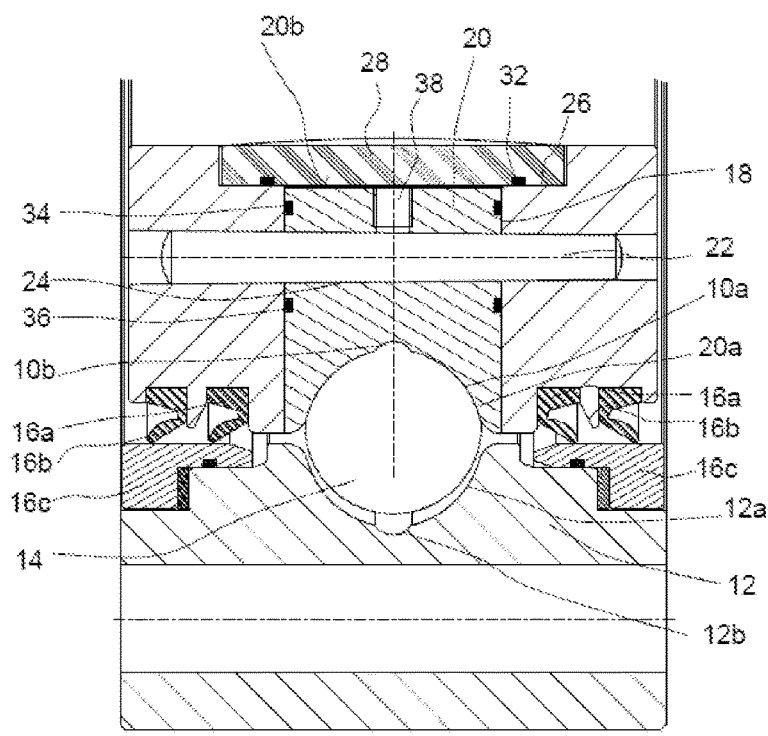
FIG. 2 is a sectional view of the rolling bearing according to the invention.
Figure 3:
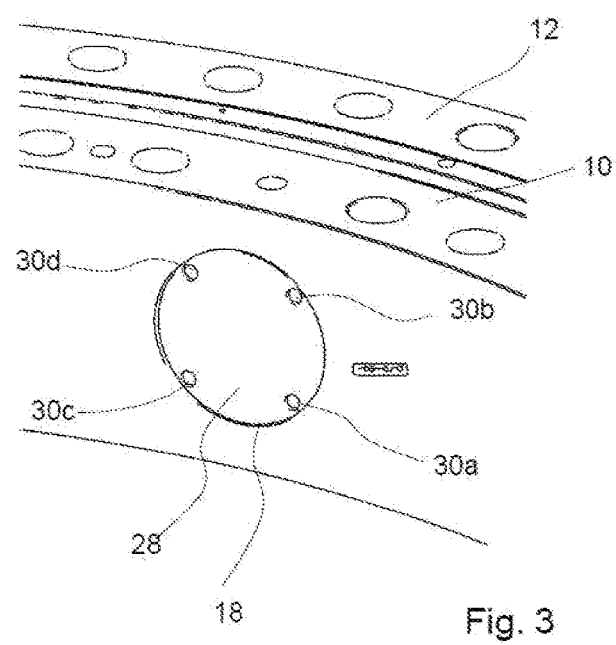
FIG. 3 is a perspective view of the protective cap in its mounted configuration.

FIG. 1 is a partial section of a rolling bearing according to the invention. The rolling bearing includes a first ring 10 formed as an inner ring and a second ring 12 formed as an outer ring. The rolling bearing is a deep-grooved ball bearing (DGBB) with large diameter and each of the rings 10, 12 is provided with deep grooves forming a raceways 10a, 12a for rolling elements 14 such as balls (FIGS. 2 and 3). A lubricant groove 10b, 12b is formed in the bottom of each raceway 10a, 12a respectively.

The toroidal space between the raceways is sealed in both axial directions by suitable sealing rings 16a, 16b collaborating with a ring-shaped insert 16c forming a gliding surface on which the sealing ring 16a, 16b abut respectively.

The first ring 10 is provided with a bore from the radially inner surface of the first ring 10 to the space between the raceways 10a, 10b. The bore is an opening 18 for inserting the rolling elements 14 and suitable spacers (not illustrated) for angularly spacing apart the rolling elements 14 into the space between the raceways 10a, 12a and for taking the rolling elements 14, which are formed as balls, out of the space for maintenance purposes.

When the bearing is operating, the opening 18 is closed by a plug 20 which is held in place by a slightly conical locking pin 22 fitted through a transversal bore 24 in the plug 20 aligned with corresponding transversal bores in the first ring 10. The ends of the bores are sealed with silicone in the embodiment illustrated in FIG. 1 and could be sealed with protective caps in other embodiments.

The bearing is configured to be used in submarine applications where it is exposed to sea water.

The plug 20 has an inner end face 20a facing the rolling elements 14 and being a part of the raceway 10a. The plug 20 is mounted when the raceway 10a is machined so such that a smooth raceway 10a without steps at the edges of the plug 20 is achieved. The material of the plug 20 is identical to the material of the inner ring 10, i.e. the plug is made of bearing steel. The outer surface of the rings 10, 12 in contact with sea water are coated with an anti-corrosion coating.

FIG. 2 is a sectional view of the rolling bearing according to the invention.

The plug 20 has an outer end face 20b which is opposite to the inner end face 20a and which is flush with the bottom of a recess 26 machined in the radially inner surface of the inner ring 10 and the recess 26 receives a protective cap 28 made of polyetheretherketone (PEEK) for protecting the outer end face 20b of the plug 20 from the corrosive environment of the bearing, i.e. from sea water. The protective cap 28 is counter-sunk in the inner surface of the inner ring 10 and fixed to the bottom surface of the recess 26, which is the surface of surrounding the opening 18, by means of stainless steel bolts 30a-30d (FIGS. 1 and 3).

A gasket ring 32 is fitted into a groove in the inner side of the protective cap 28 and pressed against the bottom surface of the recess 26 by the pressure generated by the bolts 30a-30d. The gasket ring 32 is arranged between the opening 18 and the bolts 30a-30d, i.e. radially inward with regard to the axis of the opening 18 such as sea water leaking in via the bolts 30a-30d or via the edges of the protective cap 28 is prevented from reaching the opening 18.

The plug 20 is further provided with a threaded bore 38 for engagement with a tool for mounting and unmounting the plug.

Further, the radially outer surfaces of the essentially cylindrical plug 20 are provided with grooves receiving one O-ring 34, 36 respectively, wherein the first one 34 of the O-rings is arranged between the pin 22 and the protective cap 28 and the other O-ring 36 is arranged between the pin 22 and the space receiving the rolling elements 14.

The assembly procedure for the bearing according to the invention is as follows. The rolling elements 14 are inserted together with spacers and grease via the opening 18 which is then closed with the plug 20. The plug 20 is fixed by means of the pin 22 and the bores receiving the pin 22 are closed with silicone. Then, the protective cap 28 is mounted using the bolts 30a-30d.

FIG. 3 is a perspective view of a part of the bearing showing the protective cap fixed with the bolts 30a-30d in the assembled configuration.

The invention claimed is:

1. A rolling bearing comprising:
a first ring having a first raceway thereon;
a second ring having a second raceway thereon;
rolling elements arranged between the first and second rings;
wherein the first ring is provided with an opening for inserting the rolling elements into a space between the first raceway of the first ring and the second raceway of the second ring or for taking the rolling elements out of the space between the first and second raceways;
a plug assembly comprising:
 a plug, wherein the plug is configured to close the opening when the rolling bearing is operating, the plug having an inner end face facing the rolling elements and configured to form a part of the first raceway and an outer end face opposite to the inner end face;
 a protective cap formed from a material that is different than the plug and shielding the outer end face of the plug from an environment of the rolling bearing, when viewing a cross section of the rolling bearing, the protective cap has an axial length that is greater than a plug axial length and the protective cap completely covers the outer end face of the plug and extends past both axial ends of the plug, the protective cap being secured to the first ring by bolts that pass through the protective cap and into the first ring such that the bolts are spaced from the plug and such that the protective cap is not secured directly to the plug, the protective cap being free of through-holes therein that radially overlap the plug;
 a gasket positioned axially between the bolts that secure the protective cap to the first ring and the plug such that, when viewing the cross section of the rolling bearing, the gasket is axially spaced from the plug.

2. The rolling bearing according to claim 1, the protective cap is made of polyetheretherketone (PEEK).

3. The rolling bearing according to claim 1, the gasket arranged between the protective cap and a surface of the first ring surrounding the opening.

4. The rolling bearing according to claim 1, the bolts for fixing the protective cap on a surface of the first ring surrounding the opening being stainless steel bolts.

5. The rolling bearing according to claim 3, the bolts for fixing the protective cap on the surface of the first ring surrounding the opening being stainless steel bolts,
wherein the gasket is arranged between the stainless steel bolts and the opening.

6. The rolling bearing according to claim 1, the plug has an essentially cylindrical outer surface provided with at least one circumferential groove for receiving an O-ring.

7. The rolling bearing according to claim 1, further comprising a locking pin to be fitted into a transversal bore of the plug,
wherein at least one O-ring is arranged between the transversal bore and the inner end face of the plug.

8. The rolling bearing according to claim 1, further comprising a locking pin to be fitted into a transversal bore of the plug,
wherein at least one O-ring is arranged between the transversal bore and the outer end face of the plug.

9. The rolling bearing according to claim 1, wherein the rolling bearing is formed as a slewing bearing for submarine applications.

10. A machine including at least one rolling bearing, each of the at least one rolling bearing includes:
a first ring having a first raceway thereon;
a second ring having a second raceway thereon;
rolling elements arranged between the first and second rings;
wherein the first ring is provided with an opening for inserting the rolling elements into a space between the first raceway of the first ring and the second raceway of the second ring or for taking the rolling elements out of the space between the first and second raceways;
a plug assembly comprising:
a plug, wherein the plug is configured to close the opening when the at least one rolling bearing is operating, the plug having an inner end face facing the rolling elements and configured to form a part of the first raceway and an outer end face opposite to the inner end face; and
a protective cap formed from a material that is different than the plug and shielding the outer end face of the plug from an environment of the at least one rolling bearing, when viewing a cross section of the at least one rolling bearing, the protective cap has an axial length that is greater than a plug axial length and the protective cap completely covers the outer end face of the plug and extends past both axial ends of the plug, the protective cap being secured to the first ring by bolts that pass through the protective cap and into the first ring such that the bolts are spaced from the plug and such that the protective cap is not secured directly to the plug, the protective cap being free of through-holes therein that radially overlap the plug;
a gasket positioned axially between the bolts that secure the protective cap to the first ring and the plug such that, when viewing the cross section of the at least one rolling bearing, the gasket is axially spaced from the plug;
wherein the plug assembly is integrated into the machine.

11. The machine according to claim 10, wherein the at least one rolling bearing is formed as a slewing bearing for submarine applications.

* * * * *